(12) United States Patent
Green

(10) Patent No.: US 9,332,878 B1
(45) Date of Patent: May 10, 2016

(54) MANUAL GRATE CASE BARBECUING DEVICE

(71) Applicant: Randolph E. Green, Roxbury, MA (US)

(72) Inventor: Randolph E. Green, Roxbury, MA (US)

( * ) Notice: Subject to any disclaimer, the term of this patent is extended or adjusted under 35 U.S.C. 154(b) by 327 days.

(21) Appl. No.: 13/895,458

(22) Filed: May 16, 2013

(51) Int. Cl.
*A47J 43/18* (2006.01)
*A47J 37/04* (2006.01)

(52) U.S. Cl.
CPC .................................... *A47J 37/049* (2013.01)

(58) Field of Classification Search
CPC .......................... A47J 33/00; Y10T 403/7001
USPC ............. D7/325, 359, 409, 686; 99/340, 393, 99/401, 402, 419, 427, 450
See application file for complete search history.

(56) References Cited

U.S. PATENT DOCUMENTS

| | | | |
|---|---|---|---|
| 110,589 A | 12/1870 | Read et al. | |
| 193,393 A | 7/1877 | Bolton | |
| 195,306 A | 9/1877 | Poole | |
| 306,164 A * | 10/1884 | Langley | 99/402 |
| RE11,080 E * | 5/1890 | Perkins | 99/402 |
| 431,550 A | 7/1890 | Brooks | |
| 890,219 A * | 6/1908 | Cook | 99/402 |
| 1,091,877 A * | 3/1914 | Collis | 126/30 |
| 1,945,165 A * | 1/1934 | Smith | 99/441 |
| 2,148,879 A | 2/1939 | Rossini et al. | |
| 2,317,388 A * | 4/1943 | Lako, Jr. | 99/339 |
| D164,107 S | 7/1951 | Doblin | |
| 2,607,286 A * | 8/1952 | Krissel | 99/392 |
| 2,652,766 A * | 9/1953 | Cralle | 99/349 |
| 2,689,518 A * | 9/1954 | Beach | 99/441 |
| 2,752,846 A * | 7/1956 | Lucas | 99/441 |
| 2,809,580 A * | 10/1957 | Lawrence | 99/402 |
| 2,827,847 A * | 3/1958 | Shafter | 99/402 |
| 3,207,059 A * | 9/1965 | Hirons | 99/349 |
| 3,433,151 A * | 3/1969 | Farran et al. | 99/441 |
| 4,184,419 A | 1/1980 | Ponte | |
| 4,625,634 A * | 12/1986 | Kruper | A47J 37/049 99/402 |
| 4,656,927 A | 4/1987 | Mosby et al. | |
| 5,048,882 A * | 9/1991 | Fielding | A47J 37/0694 16/425 |
| 6,526,876 B2 | 3/2003 | Kahler et al. | |
| D510,510 S * | 10/2005 | Zemel | D7/683 |
| D532,654 S * | 11/2006 | Raichlen et al. | D7/409 |

* cited by examiner

*Primary Examiner* — Thien S Tran

(57) ABSTRACT

A manual grate case barbecuing device facilitates turning food items while cooking. The device includes a base panel having a pair of planar outer sections and a planar medial section extending between the planar outer sections. The outer sections form respective obtuse angles relative to the medial section. Each of a pair of end bars is coupled to the base panel and positioned to extend between the outer sections wherein the base panel and the end bars define an interior space configured for holding food items. A cover panel is provided having a pair of planar outer portions and a planar medial portion extending between the outer portions. The cover panel is pivotally coupled to the base panel and positioned to selectively cover and enclose the interior space. A base handle is coupled to and extends from the base panel.

12 Claims, 3 Drawing Sheets

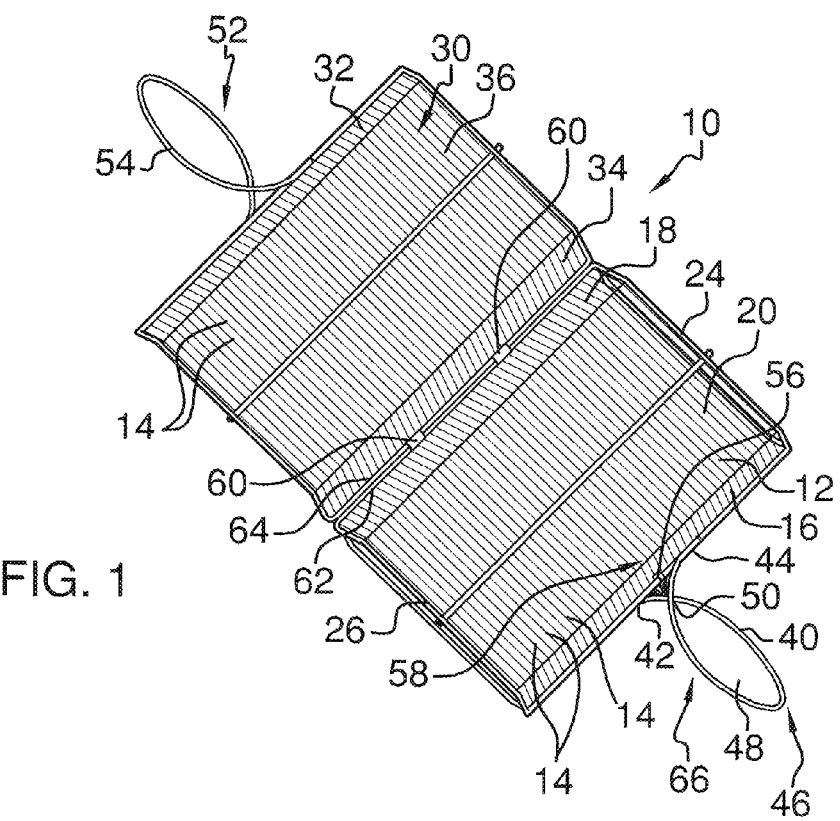
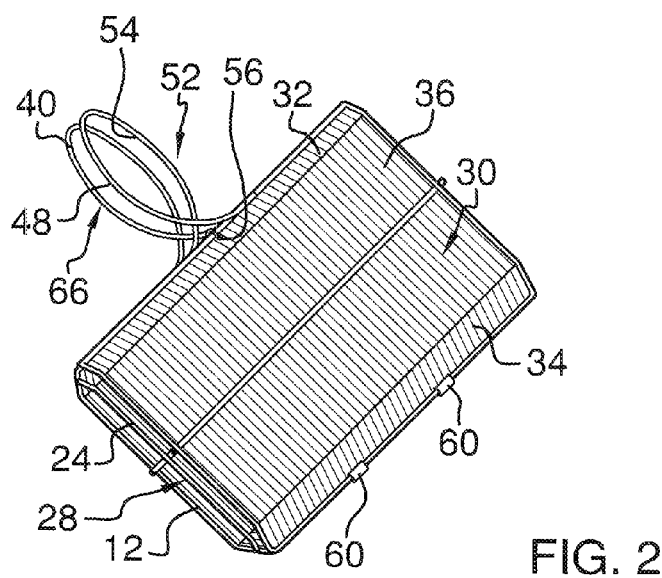
FIG. 1
FIG. 2

MANUAL GRATE CASE BARBECUING DEVICE

BACKGROUND OF THE DISCLOSURE

Field of the Disclosure

The disclosure relates to cooking basket devices and more particularly pertains to a new cooking basket device for holding food items and facilitating turning the food items while cooking.

SUMMARY OF THE DISCLOSURE

An embodiment of the disclosure meets the needs presented above by generally comprising a base panel having a pair of planar outer sections and a planar medial section extending between the planar outer sections. The outer sections extend outwardly and away from the medial section wherein each outer section forms a respective obtuse angle relative to the medial section. Each of a pair of end bars is coupled to the base panel and positioned to extend between the outer sections wherein the base panel and the end bars define an interior space configured for holding food items. A cover panel is provided having a pair of planar outer portions and a planar medial portion extending between the outer portions. The cover panel is pivotally coupled to the base panel and positioned to selectively cover and enclose the interior space. A base handle is coupled to and extends from the base panel.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 1 is a top front side perspective view of a manual grate case barbecuing device according to an embodiment of the disclosure in a partially open position.

FIG. 2 is a top front side perspective view of an embodiment of the disclosure in a closed position.

DESCRIPTION OF THE PREFERRED EMBODIMENT

Figure 3:
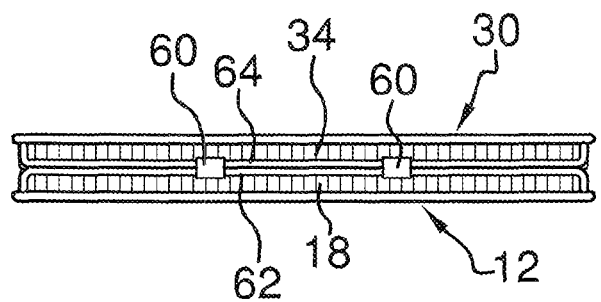
FIG. 3 is a bottom view of an embodiment of the disclosure.
Figure 4:
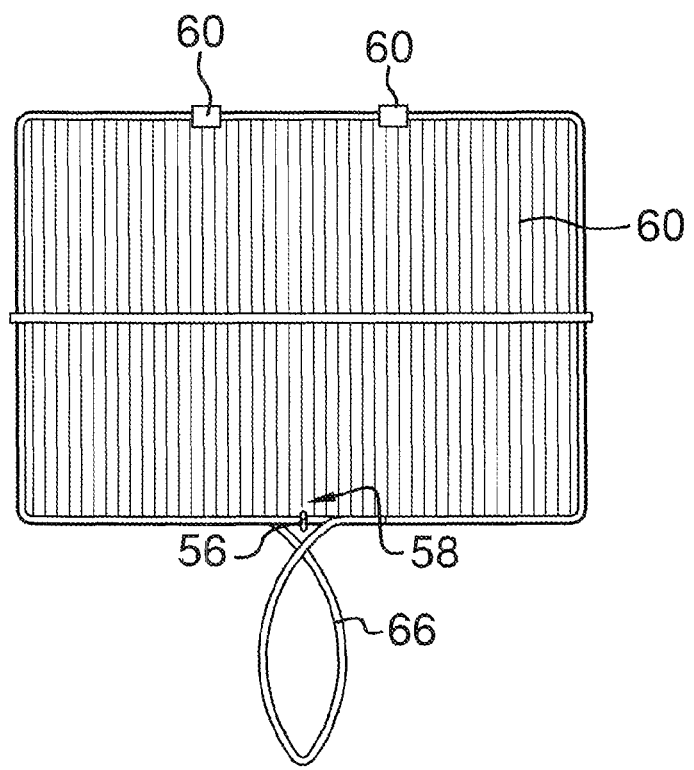
FIG. 4 is an inverted front view of an embodiment of the disclosure.
Figure 5:
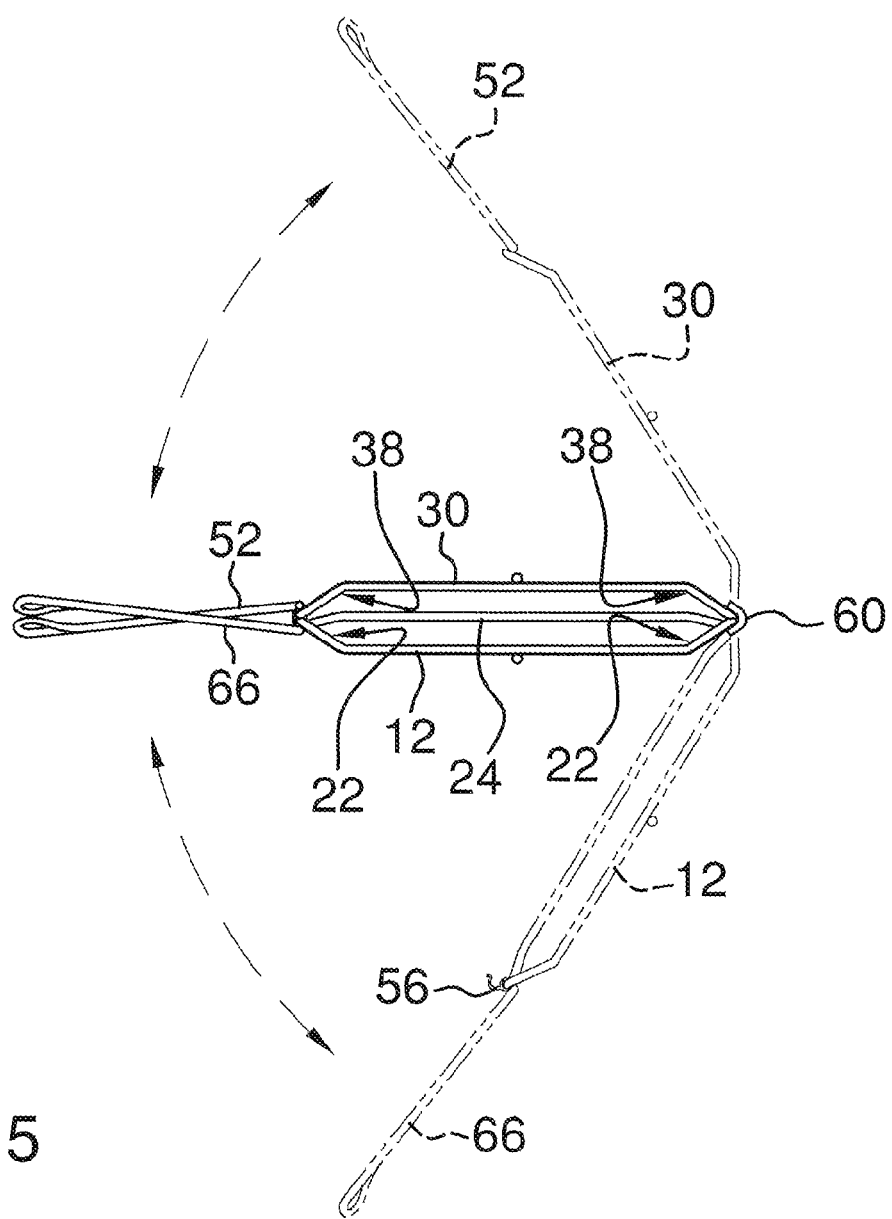
FIG. 5 is a side view of an embodiment of the disclosure.

With reference now to the drawings, and in particular to FIGS. 1 through 5 thereof, a new cooking basket device embodying the principles and concepts of an embodiment of the disclosure and generally designated by the reference numeral 10 will be described.

As best illustrated in FIGS. 1 through 5, the manual grate case barbecuing device 10 generally comprises a base panel 12 comprising a first plurality of spaced parallel bars 14. The base panel 12 has a pair of planar outer sections 16,18 and a planar medial section 20 extending between the planar outer sections 16,18. The outer sections 16,18 extend outwardly and away from the medial section 20 wherein each outer section 16,18 forms a respective obtuse angle 22 relative to the medial section 20. A pair of end bars 24,26 is coupled to the base panel 12. Each end bar 24,26 is positioned to extend between the outer sections 16,18 wherein the base panel 12 and the end bars 24,26 define an interior space 28 configured for holding food items such as meats or other foods commonly grilled. Each end bar 24,26 may be angled end sections to position a middle section of the end bar 24,26 in spaced relationship to the medial section 20 of the base panel 12. Thus, food items are prevented from sliding off of the base panel 12 by the end bars 24,26.

A cover panel 30 comprises a second plurality of spaced parallel bars 14. The cover panel 30 also has a pair of planar outer portions 32,34 and a planar medial portion 36 extending between the outer portions 32,34. The outer portions 32,34 of the cover panel 30 extend outwardly and away from the medial portion 36 of the cover panel 30. Thus, each outer portion 32,34 forms a respective obtuse angle 38 relative to the medial portion 36 of the cover panel 30. The cover panel 30 is pivotally coupled to the base panel 12 and the cover panel 30 is positioned to selectively cover and enclose the interior space 28. The cover panel 30 is sized and shaped such that the cover panel 30 is a mirror image of the base panel 12 along the hinge line between the base panel 12 and the cover panel 30. The medial section 20 of the base panel 12 and the medial portion 36 of the cover panel 30 are positioned in parallel relationship spaced apart to permit holding of food items within the interior space 28 with sufficient closeness to permit inversion of all the food items in the interior space 28 upon inversion of the base panel 12 and the cover panel 30.

A base handle 66 is coupled to and extends from the base panel 12. The base handle 66 is formed by an elongated member 40 having opposite ends 42,44 coupled to the base panel 12. A medial section 46 of the elongated member 40 forms a substantially oval loop 48 extending from an overlapped junction 50 in the elongated member 40. A cover handle 52 is also coupled to and extends from the cover panel 30. The base handle 66 is aligned with the cover handle 52 when the cover panel 30 is in a closed position covering the interior space 28. The cover handle 52 is similarly structured utilizing an elongated member 54 coupled to the cover panel 30 and similarly configured to the base handle 66.

A clip 56 is coupled to the base panel 12. The clip 56 is selectively engageable to the cover panel 30 wherein the clip 56 secures the cover panel 30 in the closed position extending over the interior space 28. The clip 56 is positioned proximate a junction 58 of the base handle 66 and the base panel 30 between the opposite ends 42,44 of the elongated member 40. A pair of spaced loops 60 are provided. Each loop 60 is coupled to adjacently positioned edges 62,64 of the base panel 12 and the cover panel 30 respectively, wherein the base panel 12 is hingedly coupled to the cover panel 30.

In use, food items are positioned on the base panel 12 in the interior space 28. The cover panel 30 is moved into the closed position and the clip 56 is secured to the cover panel 30. The food items for a desired period of time before the device 10 is inverted on the grill effectively flipping all the food items simultaneously preventing the user from prolonged exposure to heat from the grill.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A manual grate case barbecuing device comprising:
   a base panel having a pair of planar outer sections and a single planar medial section extending between said planar outer sections, said outer sections extending outwardly and away from said medial section wherein each outer section forms a respective obtuse angle relative to said medial section;
   a pair of end bars, each end bar being coupled to said base panel and positioned to extend between said outer sections wherein said base panel and said end bars define an interior space configured for holding food items;
   a cover panel, said cover panel having a pair of planar outer portions and a planar medial portion extending between said outer portions, said cover panel being pivotally coupled to said base panel and said cover panel being positioned to selectively cover and enclose said interior space;
   a base handle coupled to and extending from said base panel; and
   a cover handle, said cover handle having a length substantially equivalent to a length of said base handle, said cover handle being coupled to and extending from said cover panel such that said cover handle is coextensive and aligned with said base handle when said cover panel is positioned to selectively cover and enclose said interior space.

2. The assembly of claim 1, further comprising said base panel comprising a plurality of spaced parallel bars.

3. The assembly of claim 1, further comprising said cover panel comprising a plurality of spaced parallel bars.

4. The assembly of claim 1, further comprising said outer portions of said cover panel extending outwardly and away from said medial portion of said cover panel wherein each outer portion forms a respective obtuse angle relative to said medial portion of said cover panel.

5. The assembly of claim 4, further comprising said cover panel being sized and shaped wherein said cover panel is a mirror image of said base panel.

6. The assembly of claim 1, further comprising a clip coupled to said base panel, said clip being selectively engageable to said cover panel wherein said clip secures said cover panel is a closed position extending over said interior space.

7. The assembly of claim 6, further comprising said clip being positioned proximate a junction of said base handle and said base panel.

8. The assembly of claim 1, further comprising a pair of spaced loops, each loop being coupled to adjacently positioned edges of said base panel and said cover panel wherein said base panel is hingedly coupled to said cover panel.

9. The assembly of claim 1, further comprising said base handle being aligned with said cover handle when said cover panel is in a closed position covering said interior space.

10. The assembly of claim 1, further comprising said base handle being formed by an elongated member having opposite ends coupled to said base panel.

11. The assembly of claim 10, further comprising a medial section of said elongated member forming a substantially oval loop extending from an overlapped junction in said elongated member.

12. A manual grate case barbecuing device comprising:
    a base panel, said base panel comprising a first plurality of spaced parallel bars, said base panel having a pair of planar outer sections and a single planar medial section extending between said planar outer sections, said outer sections extending outwardly and away from said medial section wherein each outer section forms a respective obtuse angle relative to said medial section;
    a pair of end bars, each end bar being coupled to said base panel and positioned to extend between said outer sections wherein said base panel and said end bars define an interior space configured for holding food items;
    a cover panel, said cover panel comprising a second plurality of spaced parallel bars, said cover panel having a pair of planar outer portions and a planar medial portion extending between said outer portions, said outer portions of said cover panel extending outwardly and away from said medial portion of said cover panel wherein each outer portion forms a respective obtuse angle relative to said medial portion of said cover panel, said cover panel being pivotally coupled to said base panel and said cover panel being positioned to selectively cover and enclose said interior space, said cover panel being sized and shaped wherein said cover panel is a mirror image of said base panel;
    a base handle coupled to and extending from said base panel, said base handle being formed by an elongated member having opposite ends coupled to said base panel, a medial section of said elongated member forming a substantially oval loop extending from an overlapped junction in said elongated member;
    a cover handle, said cover handle having a length substantially equivalent to a length of said base handle, said cover handle being coupled to and extending from said cover panel such that said cover handle is coextensive and aligned with said base handle when said cover panel is positioned to selectively cover and enclose said interior space;
    a clip coupled to said base panel, said clip being selectively engageable to said cover panel wherein said clip secures said cover panel is a closed position extending over said interior space, said clip being positioned proximate a junction of said base handle and said base panel; and
    a pair of spaced loops, each loop being coupled to adjacently positioned edges of said base panel and said cover panel wherein said base panel is hingedly coupled to said cover panel.

* * * * *